UNITED STATES PATENT OFFICE 2,485,122

DIAZOTYPE COMPOSITIONS CONTAINING N-ACYLAMINO PHENOL COUPLERS

William H. von Glahn, Loudonville, and Lester N. Stanley, Delmar, N. Y., assignors to General Aniline & Film Corporation, New York, N. Y., a corporation of Delaware No Drawing. Application May 8, 1946, Serial No. 668,316

5 Claims. (Cl. 95—6)

The present invention relates to the preparation of sepia toned diazo prints and more particularly to the manufacture of sepia toned transition prints or intermediate prints on a transparent base stock and specifically to the coupling components utilized in the preparation of such prints.

As is known, the diazotype process involves treating a base such as paper or the like with a sensitizing composition containing a light-sensitive diazo compound, exposing the treated base through a pattern and subjecting the exposed material to development by means of an alkali in the presence of an azo dye coupling component capable of reacting with the undestroyed diazo compound to produce azo dyestuff images. This process, which is of rather general application in the formation of prints from original patterns, has become increasingly more important in the preparation of transition prints or intermediate prints on a transparent base stock for the purpose of reproducing drawings, originals of old manuscripts and the like. The efficiency of these prints depends on two factors, to wit, the opacity of the azo dye image formed to ultraviolet light and the transparency of the background. Up to the present, sepia papers for this purpose have been quite generally produced with resorcinol as the azo coupling component. This is attributable to the fact that this coupler with the diazos usually employed in the diazotype process yields azo dye images which have good opacity to ultraviolet light.

There is, however, a material objection to the utilization of this coupler despite the type of dye images which it yields and this is its low precoupling stability. Due to this property of resorcinol when it is used for the sensitization of bases for the production of diazotypes, the sensitized paper or foil may gradually develop a yellow background, as a consequence of which the transparency of the background is materially diminished. This means in turn that the efficiency of the print for reproduction work is greatly impaired.

We have now discovered that N-acyl substituted aminophenols when used as azo coupling components with the usual light-sensitive diazos, give sepia dyes of good opacity and possess outstanding stability to precoupling in the coated base, especially under acid conditions. In other words, the N-acyl aminophenols not only have the property of yielding azo dye images opaque to ultraviolet light; they have, in addition, a high stability to precoupling which is lacking in resorcinol and other couplers of a similar type.

It is accordingly an object of the present invention to utilize for the preparation of sepia toned images by the diazotype process N-acyl aminophenols as the coupling components.

Another object of the invention involves the preparation of transition prints or intermediate prints on a transparent base stock while utilizing as the coupling component an N-acyl aminophenol.

A further object of this invention is a process for producing sepia images while utilizing as the coupling component for the diazotype process an N-acyl aminophenol.

A further object of the present invention is to produce a sensitized paper for use in the preparation of transition prints or intermediate prints on a transparent base stock, in which the coupling component is an N-acyl substituted aminophenol.

Other and further important objects of the invention will become apparent as the description proceeds.

The azo coupling components which have been characterized above as N-acyl aminophenols may be said to possess the following general formula:

wherein X is hydrogen, an aliphatic radical such as alkyl, i. e., methyl, ethyl, propyl, etc., carboxyalkyl, i. e., carboxymethyl, carboxyethyl, etc., sulfoalkyl, i. e., sulfomethyl, sulfoethyl and the like, aralkyl such as sulfobenzyl and the like, aryl, i. e., phenyl and the like, and R is an acyl radical of a carboxylic or sulfonic acid and wherein the phenolic hydroxyl group may be ortho, meta or para to the acylamino group.

This class of compounds may be more precisely defined by the following formulae

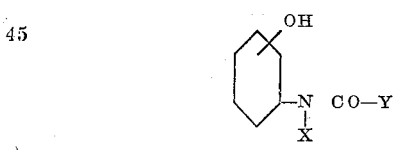

and

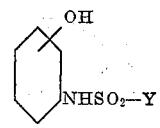

in which X has the values referred to above, the phenolic hydroxyl group may occupy a position ortho, meta or para to the acylamino group and Y is aliphatic, i. e., alkyl such as methyl, ethyl, propyl, butyl and the like, carbalkoxy, i. e., carbmethoxy, carbethoxy, etc., dialkylamino, i. e., dimethylamino and the like, alkylene diamino, i. e., ethylene diamino, carbamylalkyl, i. e., carbamyl methyl, carbamyl ethyl, etc., carboxyalkyl, i. e., carboxymethyl and the like, alkoxy, i. e., methoxy, ethoxy and the like, hydroxyalkoxy, such as hydroxymethoxy, hydroxyethoxy and the like, acylalkyl, i. e., acetylmethyl and the like, aromatic, such as phenyl, aminophenyl, sulfophenyl, hydroxyphenylamino, diethylene glycol metahydroxycarbanilate and the like, amino, hydrazino, carboxy, carbamyl, hydrogen and the like.

These classes of compounds are more specifically illustrated by the following examples:

(1) 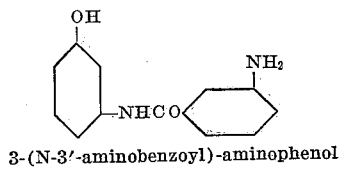
3-(N-3'-aminobenzoyl)-aminophenol (2) 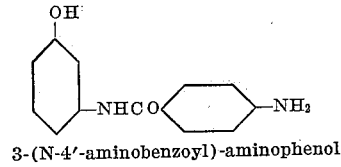
3-(N-4'-aminobenzoyl)-aminophenol (3) 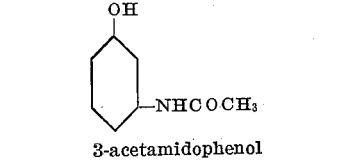
3-acetamidophenol (4) 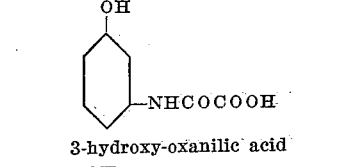
3-hydroxy-oxanilic acid (5) 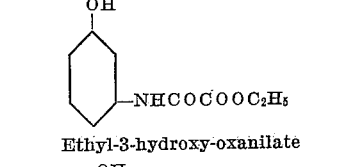
Ethyl-3-hydroxy-oxanilate (6) 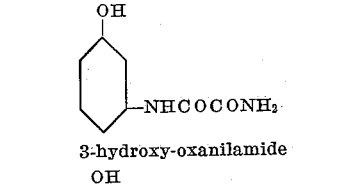
3-hydroxy-oxanilamide (7) 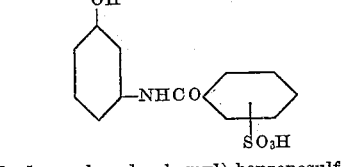
x-(m-hydroxyphenylcarbamyl) benzenesulfonic acid (8) 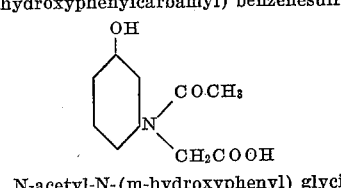
N-acetyl-N-(m-hydroxyphenyl) glycine (9) 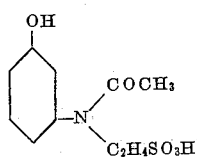
N-acetyl-N-(m-hydroxyphenyl) taurine

(10) 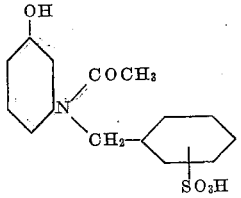
ω-(N-acetyl-m-hydroxyanilino)-x-toluenesulfonic acid

(11) 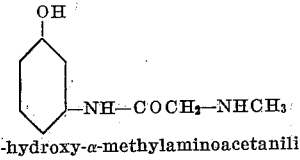
3-hydroxy-α-methylaminoacetanilide

(12) 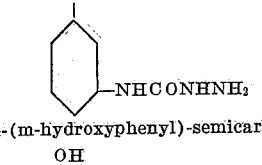
4-(m-hydroxyphenyl)-semicarbazide

(13) 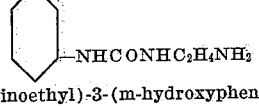
1-(2-aminoethyl)-3-(m-hydroxyphenyl) urea

(14) 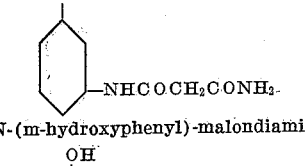
N-(m-hydroxyphenyl)-malondiamide

(15) 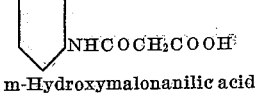
m-Hydroxymalonanilic acid

(16) 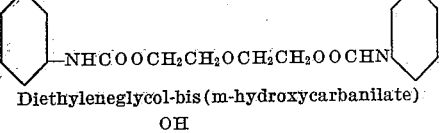
Diethyleneglycol-bis(m-hydroxycarbanilate)

(17) 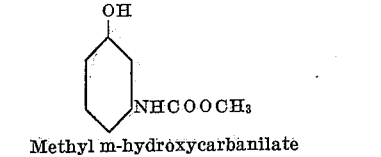
Methyl m-hydroxycarbanilate

(18) 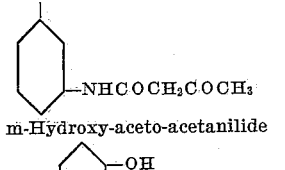
m-Hydroxy-aceto-acetanilide

(19) 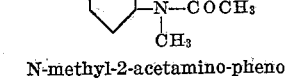
N-methyl-2-acetamino-phenol

(20) 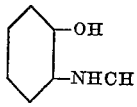
2-formylamino-phenol

(21) 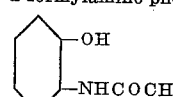
2-acetamino-phenol

(22) 
3-(x-aminophenyl)sulfonylamino-phenol

(23) 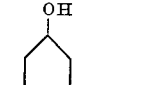
4-acetamino-phenol

(24) 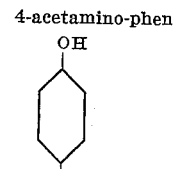
N-methyl-4-acetamino-phenol

(25) 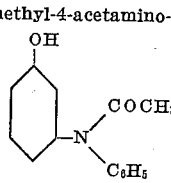
N-phenyl-3-acetaminophenol

(26) 
3-phenyl-sulfonylamino-phenol

(27) 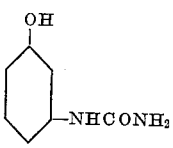
m-Hydroxy-phenylurea

(28) 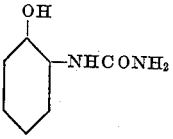
o-Hydroxy-phenyl urea

(29) 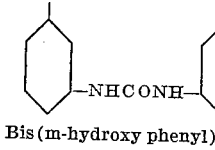
Bis(m-hydroxy phenyl) urea

Compounds of the foregoing type are known in the literature and in any case can be prepared by conventional procedure. For instance, compound (8) is obtained by acylating the corresponding m - hydroxyphenyl - glycine. Compound (9) is prepared by acylating m-hydroxy-phenyl-taurine. Compound (11) is prepared by treating m-amino-phenol with chloracetyl chloride and condensing the resulting chlor derivative with methylamine. Compound (13) is obtained by reacting m-aminophenol with ethyl chloroformate and reacting the resulting product with ethylene diamine. Compound (16) is prepared by reacting 2 moles of m-aminophenol with 1 mole of diglycol chloroformate. Compound (29) is prepared by reacting 2 moles of m-aminophenol with 1 mole of phosgene.

The diazo component which is employed for the preparation of the sepia images along with the aforementioned N-acylaminophenols may be any of those generally used in the diazotype art such as diazos derived from amino naphthol sulfonic acids but preferably those from N-substituted p-phenylene diamines. The diazos may be utilized as such or in the form of their stabilized double salts such as with zinc chloride, cadmium chloride, tin chloride or the like, as the fluoroborates or as the alkyl or aryl sulfonates such as the methyl, ethyl, propyl, phenyl and the like sulfonates or as the acid sulfates. Examples of diazos which we have found to be eminently satisfactory are:

2.5.4' - triethoxydiphenyl-4-diazonium acid sulfate

The diazos from p-(N-hydroxyethyl-N-methylamino)-aniline
p-(N-hydroxyethyl-N-ethylamino)-aniline
p-Amino-diphenylamine
4-diethylamino-o-phenetidine
4-benzoylamino-2.5-diethoxyaniline
p-Diethylaminoaniline
p-Dimethylaminoaniline
p-(N-benzyl-N-ethyl)-aniline
p-Di-(hydroxyethyl)-amino-aniline
p-Ethylamino-m-toluidine
p-(N-ethyl-N-hydroxyethylamino)-o-toluidine
p-Di-(hydroxyethyl)-amino-o-chloro-ailine
p-Ethylaminoaniline
p-Phenylenediamine The sensitizing compositions may contain the usual adjuncts such as metal salts to intensify the dyestuff image, i. e., aluminum sulfate, titanium ammonium fluoride, nickel sulfate and the like, stabilizing agents, such as thiourea, thiosinamine, naphthalene trisulfonic acid and the like, acids designed to retard precoupling, such as citric acid, tartaric acid, boric acid and the like, hygroscopic agents such as glycol, glycerine, dextrin and the like. These adjuncts are well known in the art and further details with respect thereto are considered to be unnecessary.

The base to which the sensitizing compositions are applied may be a sheet, film or web of any transparent, film-forming material, such as paper, cellulose esters such as cellulose acetate and the like.

It is preferable in preparing the sensitized papers or foils to incorporate in the sensitizing compositions both the diazo component and the azo coupling component. This is particularly true where the coupling components contain groups lending solubility in water. The invention, however, may also be carried out while applying the coupler to the exposed material along with an alkali such as sodium carbonate solution as the developer. This latter method is used with compounds (5) and (6) above. Due to the low solubility of these compounds in water, they are not suitable in papers designed for dry development.

Of the couplers referred to above, those which give best results are the ones in which the phenolic hydroxyl group stands in meta-position to the acylamino group. It has been found that such couplers couple at a faster rate than those in which the phenolic hydroxyl group is ortho- or para- to the acylamino group. In addition, they give stronger shades and for this reason they represent the preferred embodiment of the invention.

The invention is further illustrated by the following examples, although it is to be understood that these are illustrative and not limitative.

Example I

Transparentized paper is coated with the following ingredients dissolved in 100 parts of water containing 10 per cent of isopropanol:

| | Parts |
|---|---|
| 3-(N-3'-aminobenzoyl)-aminophenol | 4.1 |
| N-methyl - N - hydroxyethyl - amino-p-benzene-diazonium chloride zinc chloride double salt | 4.3 |
| Citric acid | 8 |
| Thiourea | 4 |

The coated paper thus obtained was found to be very stable to pre-coupling. When exposed to light under a positive and subsequently developed with gaseous ammonia, a sepia intermediate print was obtained. This intermediate print has excellent opacity to ultraviolet light in the sepia dye image areas. Upon subsequent exposure of an ordinary diazotype reproduction medium under this positive sepia dye image as an original and subsequent development, a clear reproduction is produced in any desired color.

Example II

The procedure is the same as in Example I excepting that the diazo of Example I was replaced by 4 parts of 1-(N-ethylamino)-2-methyl-4-benzene diazonium chloride-zinc chloride double salt. The results obtained with such sensitized material were similar to those procured in Example I but the opacity of the dyestuff images was slightly better.

Example III

Transparentized paper was coated with the following ingredients dissolved in 100 parts of water containing 10 per cent of isopropanol:

| | Parts |
|---|---|
| 3-(N-4'-aminobenzoyl) - aminophenol | 5.3 |
| 1-(N-ethylamino) - 2 - methyl-4-benzene diazonium chloride - zinc chloride double salt | 4 |
| Citric acid | 8 |
| Thiourea | 4 |

When the sensitized paper was exposed and developed, the results were similar to those obtained in Example I. Like the paper of Example I, the paper of this example has a very long storage life.

The coupling component used according to this example is prepared by condensing 3-aminophenol hydrochloride and 4-nitro-benzoyl chloride in the presence of sodium acetate as an acid binding agent. The nitro group is then reduced by iron reduction.

Example IV

Transparentized paper was coated with the following ingredients dissolved in 100 parts of water containing 10 per cent of isopropanol:

| | Parts |
|---|---|
| 3-acetylamino-phenol | 3.6 |
| N-hydroxyethyl - N - methyl - amino-p-benzene diazonium chloride-zinc chloride double salt | 3.8 |
| Citric acid | 8 |
| Thiourea | 4 |

The sensitized paper was found to have excellent stability to precoupling. Sepia prints made by exposing and developing the same showed that it had very good opacity characteristics.

Example V

Transparentized paper was coated with the following ingredients dissolved in 100 parts of water containing 3 per cent of isopropanol:

| | Parts |
|---|---|
| 3-hydroxy-oxanilic acid | 1.1 |
| N-diethylamino-p-benzene diazonium chloride-zinc chloride double salt | 2.2 |
| Citric acid | 8 |
| Thiourea | 4 |

Paper coated with this composition had a very good pre-coupling stability. It also yielded sepia prints with a fine opacity.

Example VI

Transparentized paper is coated with the following ingredients dissolved in 100 parts of water containing 10 per cent of isopropanol:

| | Parts |
|---|---|
| 3-(p-aminophenylsulfonylamino) phenol | 2.5 |
| N - methyl - N - hydroxyethylamino-p-benzene-diazonium chloride zinc chloride double salt | 3 |
| Citric acid | 8 |
| Thiourea | 4 |
| Zinc chloride | 5 |

The coated paper thus obtained was found to be very stable to pre-coupling. When exposed to light under a positive and subsequently developed with gaseous ammonia, an orange sepia print was obtained which had good opacity characteristics.

We claim:

1. Light-sensitive diazotype material comprising a base carrying a light-sensitive diazo component and as the azo component a compound of the following formula:

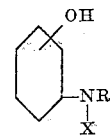

wherein X is a member selected from the class consisting of hydrogen, aliphatic radicals and araliphatic radicals, and R is an acyl radical selected from the class consisting of benzoyl and benzsulfonyl radicals.

2. The article as defined in claim 1 wherein the base is transparent.

3. Light-sensitive diazotype material comprising a base carrying a light-sensitive diazo compound and as the azo component 3-(N-3'-aminobenzoyl) amino-phenol.

4. Light-sensitive diazotype material comprising a base carrying a light-sensitive diazo compound and as the azo component 3-(N-4'amino benzoyl) amino-phenol.

5. The light-sensitive material defined in claim 1 wherein R is a benzoyl radical.

WILLIAM H. von GLAHN.
LESTER N. STANLEY.

REFERENCES CITED

The following references are of record in the file of this patent:

UNITED STATES PATENTS

| Number | Name | Date |
|---|---|---|
| 1,870,930 | Sprongerts | Aug. 9, 1932 |
| 2,088,328 | Leister | July 27, 1937 |
| 2,229,200 | Wehrli | Jan. 21, 1941 |
| 2,245,628 | Poser | June 17, 1941 |
| 2,246,425 | Poser | June 17, 1941 |
| 2,298,444 | Weissberger | Oct. 13, 1942 |
| 2,375,366 | Jacobus | May 8, 1945 |

FOREIGN PATENTS

| Number | Country | Date |
|---|---|---|
| 283,274 | Great Britain | Jan. 6, 1928 |
| 294,972 | Great Britain | Aug. 3, 1928 |
| 677,685 | Germany | Sept. 12, 1939 |